United States Patent [19]

Telford et al.

[11] Patent Number: 4,487,843

[45] Date of Patent: Dec. 11, 1984

[54] CATALYTIC ACTIVITY OF ALUMINOSILICATE ZEOLITES

[75] Inventors: Clive D. Telford, Ascot; Dennis Young, Staines, both of England

[73] Assignee: British Petroleum Company, p.l.c., London, England

[21] Appl. No.: 579,721

[22] Filed: Feb. 13, 1984

[30] Foreign Application Priority Data

Mar. 9, 1983 [GB] United Kingdom ............... 8306532

[51] Int. Cl.$^3$ .............................................. B01J 37/10
[52] U.S. Cl. ...................................... 502/85; 502/61; 502/73; 585/415
[58] Field of Search ................. 502/61, 64, 73, 85

[56] References Cited

U.S. PATENT DOCUMENTS

| | | | |
|---|---|---|---|
| 3,706,694 | 12/1972 | Young | 502/73 X |
| 4,175,057 | 11/1979 | Davies et al. | 502/61 |
| 4,242,333 | 12/1980 | Ball et al. | 423/328 X |
| 4,346,021 | 8/1982 | Ball et al. | 423/328 X |
| 4,407,728 | 10/1983 | Ball et al. | 502/60 |
| 4,452,908 | 6/1984 | Ball et al. | 502/61 |

FOREIGN PATENT DOCUMENTS

| | | | |
|---|---|---|---|
| 5909 | 12/1979 | European Pat. Off. | 502/64 |
| 30811 | 6/1981 | European Pat. Off. | |
| 35830 | 9/1981 | European Pat. Off. | |

*Primary Examiner*—Carl F. Dees
*Attorney, Agent, or Firm*—Brooks Haidt Haffner & Delahunty

[57] ABSTRACT

The present invention relates to a method of improving catalytic activity of a zeolite by first steam treating the zeolite and then loading the zeolite so treated with a Group IIIb metal, especially gallium. It has been found that steam treatment prior to gallium loading gives a catalyst which has a higher conversion and selectivity of hydrocarbon feeds to aromatics than otherwise.

9 Claims, No Drawings

CATALYTIC ACTIVITY OF ALUMINOSILICATE ZEOLITES

The present invention relates to a method of improving the catalytic activity of aluminosilicate zeolites, and in particular the activity of freshly made zeolites loaded with gallium or aluminium compounds or, gallium or aluminium ions.

Aluminosilicate zeolites and their gallium loaded derivatives are well known for their ability to catalyse hydrocarbon conversion reactions. These zeolites and their methods of preparation are claimed and described in our British patent specification Ser. No. 1561690 and in our published copending European patent application Nos. 002900, 0024930 and 0036292. Such zeolites are generally prepared by reacting in aqueous solution a mixture of a source of silica, a source of alumina, a source of alkali metal and a nitrogen containing base in appropriate proportions. The zeolite is then allowed to crystallise from the solutions by maintaining the solution at an appropriate elevated temperature under autogenous pressure. For most uses, it is necessary to remove the nitrogen containing base and the alkali metal from the "as synthesised" zeolite. (By "as synthesised" is meant here and throughout the specification a zeolite which is separated from its mother liquor and washed with neutral, acidic or alkaline aqueous solutions). Various methods have hitherto been used to achieve this e.g. calcination in air followed by ion-exchange with hydrogen or ammonium cations. It is also known that the zeolite can be bound, before or after calcination or ion exchange or both, with a suitable matrix material such as silica or alumina to improve its mechanical stability. It is also known to load the zeolite, before or after binding, with catalytically active ions or compounds such as those derived from gallium or aluminium by for example ion-exchange or impregnation techniques.

Prior art publications refer to various methods of activating these zeolites whether or not loaded with an additional catalytic component. These include treatment of the zeolite with hydrogen, oxygen or a combination of the two in sequence. However, if the calcination stage during the preparation of the zeolite is carried out at or about 550° C. under substantially dry conditions, the resulting catalysts have a high initial activity in hydrocarbon conversion reactions but also produce coke at a high rate and therefore deactivate rapidly.

It is also generally known that steam-treatment of zeolites tends to reduce the activity thereof due to dealumination of the zeolite. However, for instance in European patent publication No. 35830 a combination of steam treatment and base exchange has been used to improve the performance of the zeolite. None of this prior work, however, deals with Group IIIb metal, e.g. gallium or aluminium, loaded zeolites. Moreover the effect of steam treatment during various stages of catalyst preparation has not been understood hitherto.

It has now been found unexpectedly that treating the crystalline aluminosilicate with steam at elevated temperature prior to the loading thereof with a compound of a metal from Group IIIb of the Periodic Table significantly improves the activity and active life of the catalyst so formed.

Accordingly, the present invention is a process for activating an aluminosilicate loaded with a compound of a metal from Group IIIb of the Periodic Table said process comprising bringing into contact the unloaded zeolite with steam at an elevated temperature prior to loading thereof with a compound of a metal from Group IIIb of the Periodic Table.

The expression "activating an aluminosilicate zeolite" as used herein and throughout the specification means activating unused, freshly prepared zeolites.

The zeolites which may be activated by a process of the present invention are aluminosilicates which preferably have a high silica to alumina ratio, i.e. greater than 5:1. Methods of preparing such zeolites are described for instance in our published European patent application Nos. 0024930 and 0030811. Particularly useful zeolites are MFI-type zeolites.

Zeolites are best characterised according to framework structure type, i.e. on the topology of the framework, irrespective of composition, distribution of different tetrahedral atoms, cell dimensions and symmetry. A code consisting of three capital letters has been adopted for each known structure type following the recommendations by IUPAC on zeolite nomenclature ("Chemical Nomenclature, and Formulation of Compositions, of Synthetic and Natural Zeolites," IUPAC yellow booklet, 1978) and a compilation of 38 known zeolite structure types has been published by The Structure Commission of the International Zeolite Association ("Atlas of Zeolite Structure Types", by Meier, W. M. and Olsen, D. H. (1978), distributed by Polycrystal Book Service, Pittsburgh, Pa., USA).

By Periodic Table is meant here and throughout the specification the "Periodic Table" of Elements in the 44th Edition of the "Handbook of Chemistry and Physics", Ed. Hodgman, C. D. et al, pp 448 and 449 (1963) and published by the Chemical Rubber Publishing Co., Ohio, U.S.A.

Specific examples of the Group IIIb metals which may be used as their compounds to load the zeolites in the present invention include aluminium, gallium, indium and thallium. Compounds of gallium, especially the oxide are the most preferred. Loading methods are well known to those skilled in the art. Examples of such methods are ion exchange and impregnation of the zeolite with aqueous solutions of the relevant compound or ion.

The steam treatment can be carried out at any stage in the preparation of an active catalyst provided it precedes the loading step with a catalytically active Group IIIb metal compound such as e.g. gallium oxide. Thus for example, if the liquor-free zeolite contains an organic (nitrogeneous) base which requires removal by calcination in air (for example in order to improve catalytic performance), the steaming step can be conveniently included in this calcination. Alternatively the steaming step can be effected after this calcination. The steaming step can be carried out before or after binding. The steaming step is preferably carried out on a zeolite in which substantially all of the exchangeable metal ions such as sodium ions have been exchanged with hydrogen or ammonium ions. Our prior publications referred to above describe various methods of achieving this exchange.

The steam treatment of the zeolite is suitably carried out using steam as such or a carrier gas stream comprising steam. The carrier gas stream may be a gas inert under the reaction conditions e.g. nitrogen, or air. The gas stream used for steam treatment suitably contains between 1 and 100% by volume of steam, preferably between 10 and 100% by volume of steam. The steam treatment is suitably carried out at 0.01–1.0 MPa, preferably at 0.1 MPa.

The steam treatment is suitably carried out at a temperature between 300° and 750° C., preferably 500° and 700° C. for a duration of between 5 minutes and 200 hours, preferably 1 and 12 hours.

Increasing the severity of one or more parameters may allow reduction of the severity of other parameters. For example, raising the steaming temperature may reduce the duration of steaming.

The steam treatment referred to herein may be preceded or followed by any conventional oxidation and reduction treatments. That is, the zeolite may for instance be treated with air and/or hydrogen at an elevated temperature in either order after the steam treatment step or the metal loading step.

EXAMPLES AND COMPARATIVE TESTS

(A) Preparation of Bound Zeolite

A liquor-free MFI-type zeolite ($SiO_2:Al_2O_3$ molar ratio = 37.3) was prepared in a manner substantially similar to that outlined in Example 1(a) of our European patent application No. 0024930. (The starting gel had a relative molar composition 2.2 $Na_2O$:18.3 DEA: $Al_2O_3$:36.3 $SiO_2$:532 $H_2O$). It was washed with dilute nitric acid (ca 13 wt % $HNO_3$, ca 5 ml solution:1 g zeolite) then dried, then bound with alumina and calcined at 550° C. for three hours in dry flowing air.

(B) Example 1 (Steam treatment followed by gallium loading by an exchange procedure)

(i) A sample of the bound zeolite from A was heated in a tube furnace to 550° C. in flowing air. Steam (20% v/v in air) was then passed over the zeolite for 2 hours and thereafter the zeolite was allowed to cool in air.

(ii) A sample of the steamed bound zeolite from (i) above was then brought into contact first with slightly acidic water (pH 5 to 6) (ratio 4:5 ml water:1 g solid zeolite) and then with an aqueous solution of gallium nitrate (0.36 M titrated to pH 2.7 with aqueous ammonia) in the ratio of 1 ml solution:1 g of solid zeolite. The resultant mixture was then rapidly heated to reflux and maintained at the refluxing temperature for 4 hours. The resultant product was filtered while hot, the solid gallium loaded product washed thoroughly with water and then dried at 110° C. for 16 hours to give the gallium loaded, steamed bound zeolite catalyst (gallium loading was 0.73% w/w).

(iii) 6 ml of the resultant steamed and gallium-loaded, steamed bound zeolite catalyst from (ii) above was placed in a tubular reactor, heated to 550° C. and maintained at that temperature for 4 hours in dry flowing air. The activated catalyst was then flushed with flowing nitrogen. The average bed temperature of the catalyst was maintained at 535° C. by external heating and brought into contact with n-butane (1 bar absolute pressure and 5 WHSV). The results are shown in the Table below.

Example 2 (Steam treatment followed by gallium loading by impregnation)

(i) A sample of the steam treated bound zeolite from Example 1(i) above was brought into contact with a sufficient volume (diluted if necessary with water so as to just form a slight excess of liquid) of the 0.36 M aqueous ammoniacal gallium nitrate solution of Example 1(ii) above to achieve a gallium loaded, steamed bound zeolite catalyst (gallium loading 0.73% w/w).

The resultant mixture was dried in air at 80° C. for 16 hours.

(ii) 6 ml of the gallium loaded, steamed bound zeolite catalyst from Example 2(i) above was tested for its ability to convert normal butane as in Example 1(iii) above. The results are shown in the Table below.

Comparative Test 1 (only gallium loading by an exchange procedure—no steam treatment)

(i) A sample of the bound zeolite synthesised as in (A) above was loaded (without prior steam treatment) with gallium and dried in the same manner as described in Example 1(ii) above.

(ii) A sample of the gallium loaded zeolite so formed was then activated and tested for n-butane conversion under the same conditions as in Example 1(iii) above. The results are shown in the Table below.

Comparative Test 2 (gallium loading by an exchange procedure followed by steam treatment)

(i) A sample of the gallium loaded, bound zeolite from Comparative Test 1(i) above was treated with steam in the same manner as described in Example 1(i) above.

(ii) A sample of this bound zeolite which was first gallium loaded and then steam treated was tested for its ability to convert n-butane under the same conditions as in Example 1(iii) above. The results are shown in the Table below.

Comparative Test 3 (only gallium loading by impregnation—no steam treatment)

(i) A sample of the bound zeolite from the synthesis according to (A) above was loaded (without prior steam treatment) with gallium and dried in the same manner as described in Example 2(i) above so as to produce a product having the same level of gallium loading as that in Comparative Test 1.

(ii) A sample of the gallium loaded, bound zeolite from Comparative Test 3(i) above was then activated and tested for n-butane conversion under the same conditions as in Example 1(iii) above. The results are shown in the Table below.

Comparative Test 4 (gallium loading by impregnation followed by steam treatment)

(i) A sample of the gallium-loaded, bound zeolite from Comparative Test 3(i) above was treated with steam in the same manner as described in Example 1(i) above.

(ii) A sample of the bound zeolite which had first been gallium loaded and then steam treated as in Comparative Test 4(i) was then activated and tested for n-butane conversion under the same conditions as in Example 1(iii) above. The results are shown in the Table below.

A sample of this gallium-loaded then steamed zeolite was then tested for n-butane conversion under the same conditions as described in Example 1(iii). The results are shown in the Table.

TABLE

| | Results (0.5 to 1 HOS) of n-$C_4$ Conversion over Described Catalysts | | | | | |
|---|---|---|---|---|---|---|
| | Example 1 | Test 1 | Test 2 | Example 2 | Test 3 | Test 4 |
| Feed Conversion (wt %)* | 93.4 | 92.3 | 84.1 | 87.9 | 87.3 | 81.2 |

TABLE-continued

Results (0.5 to 1 HOS) of n-C₄ Conversion over Described Catalysts

| | Example 1 | Test 1 | Test 2 | Example 2 | Test 3 | Test 4 |
|---|---|---|---|---|---|---|
| Yield Aromatics (wt %) * | 45.4 | 40.0 | 29.3 | 38.1 | 32.0 | 28.1 |
| Aromatics Selectivity (wt %)** | 48.6 | 43.3 | 34.8 | 43.5 | 36.7 | 34.6 |

*100 − (Yield n-C₄) (wt %)
**$\frac{100 \times (\text{Yield Aromatics})}{\text{Feed Conversion}}$ These results clearly show that under comparable conditions steaming prior to gallium-loading gives a catalyst that gives a higher selectivity and feed conversion to aromatics than a catalyst with no steaming. Moreover, steaming *after* gallium-loading reduces conversion and selectivity. Also, Example 2 and Tests 3 and 4 clearly show that even when there is no exchange or wash step after steaming, there is still an improvement in feed conversion and selectivity to aromatics by steaming prior to gallium loading.

We claim:

1. A process for activating an aluminosilicate loaded with a compound of a metal from Group IIIB of the Periodic Table said process comprising bringing into contact the unloaded zeolite with steam at an elevated temperature prior to loading thereof with a compound of a metal from Group IIIB of the Periodic Table.

2. A process according to claim 1 wherein the aluminosilicate has a silica to alumina ratio greater than 5:1.

3. A process according to claims 1 or 2 wherein the Group IIIB metal is selected from aluminium, gallium, indium and thallium.

4. A process according to any one of the preceeding claims wherein the compound of the Group IIIB metal is gallium oxide.

5. A process according to claim 1 or 2 wherein the steaming step is carried out on a zeolite in which substantially all of the exchangeable metal ions have been exchanged with hydrogen or ammonium ions.

6. A process according to claim 1 or 2 wherein the steam treatment of the zeolite is carried out using steam as such or a carrier gas stream comprising steam.

7. A process according to claim 1 or 2 wherein the steam treatment is carried out at a pressure between 0.01 to 1.0 MPa.

8. A process according to claim 1 or 2 wherein the steam treatment is carried out at a temperature from 300° to 750° C.

9. A process according to claim 1 or 2 wherein the steam treatment is carried out for a duration of between 5 minutes and 200 hours.

* * * * *